Patented Nov. 1, 1938

2,134,741

UNITED STATES PATENT OFFICE 2,134,741

PIGMENTED SYNTHETIC RESIN COMPOSITION

Clarence F. Silleck, Brooklyn, N. Y., assignor to C. J. Osborn Company, New York, N. Y., a corporation of New York No Drawing. Application February 11, 1936, Serial No. 63,395

8 Claims. (Cl. 106—22)

This invention relates to pigmented compositions, more particularly to those comprising synthetic resins and adapted to be used in coating materials, such as lacquers and varnishes.

Still more specifically, the invention is directed to a new method for dispersing carbon black in synthetic resinous products and in the coating compositions produced with such products. In particular, this invention relates to a novel procedure for securing a relatively complete colloidal dispersion of carbon black in synthetic resins of the type generally known as "modified polyhydric alcohol-polybasic acid resins". The invention also includes the products made from the new procedure.

Considerably difficulty has been often encountered in the making of pigmented coating compositions in adequately dispersing the pigments therein. In the case of nitrocellulose compositions, the difficulty has been largely overcome by the provision of certain dispersing agents which are of various characters such as copper oleate or other soaps, and certain dyes. These substances have proven satisfactory to obtain the desired complete dispersion and uniform dissemination of even carbon black, which has always been very difficult to handle.

Recently there has come into use the so-called "synthetics", that is, synthetic resins of the alkyd or phenolic types or the like, in coating compositions and it is, of course, highly desirable to disperse pigments therein in order to utilize such resins in all kinds of coating compositions. However, it was found impossible to get good dispersions of pigments, particularly carbon black, in the synthetics, even by using the expedients which had proved successful in nitrocellulose compositions.

Carbon black is a pigment well known to industry as an extremely finely powdered form of carbon prepared usually by the incomplete combustion of natural gases. The individual particles are colloidal in size but they exhibit a strong tendency toward the formation of agglomerates. These aggregates are possessed of very strong cohesive forces as evidenced by the difficulty of obtaining complete dispersion thereof in cellulose ester lacquers, for example, by the ordinary grinding procedures. Such complete dispersions, even when once obtained, are not in every instance permanent due probably to the lack of an optimum relationship between the charges on the particles of the colloidal black and the dispersion media. This invention contemplates a permanent dispersion of carbon black in modified polyhydric alcohol-polybasic acid and other resinous compositions.

The term "modified polyhydric alcohol-polybasic acid resinous composition" or "alkyd" makes reference to resinous products resulting from the condensation reaction between one or more polyhydric alcohols such as glycerol or glycols, and one or more polybasic acids, such as phthalic, with one or more modifying agents. These latter include drying, semi, or non-drying fixed oils, also the acids derived from the aforementioned oils. Certain of the simple fatty acids such as lauric and those with higher molecular weights, both saturated and unsaturated, may also be included as modifying agents as the term is used herein. The lower molecular weight fatty acids are also included as modifying agents in these resins. By the term "oily constituent" as used in the claims I intend to include the various compounds named above.

These resinous compositions referred to may be produced by any of the methods already known to the arts with the exception of certain modifications in the method of incorporating the various ingredients. Such modifications will appear as the process for the dispersion of the carbon black is described.

My invention is based on the idea that in order to obtain good, complete and permanent dispersion of the pigment in the resin it is necessary to incorporate the same in at least one of the ingredients of the resin at a stage prior to the formation of the resin. In this respect my method differs from prior methods of this kind in that previously the pigment was added after the chemical reactions had already taken place. To accomplish this, the pigment is usually first incorporated into the oily constituent of the resin, and thereafter the reaction is caused to take place.

When carbon black is the pigment, I utilize a water dispersion thereof. The carbon black in such a form is not new to certain industries, namely the concrete and paper industries, but no application, to applicant's knowledge, has been made of such products for the present purpose. Such dispersions are obtainable in several ways by the use of certain agents which serve to reduce the interfacial tension between the dry black and the aqueous phase. Some of the agents which have been used are: saponin, soaps, aromatic sulphonic acids and salts thereof and certain sulphonated higher alcohols. The aqueous dispersions of the black can be effected by rapidly stirring the carbon black into an aqueous medium to which a portion of the above mentioned dispersing agents have been added. The resulting dispersion is in the form of a smooth paste.

It is the purpose of this invention to utilize the paste so formed, in a novel way to secure dispersion in modified polyhydric alcohol-polybasic acid resinous compositions. For example, the aqueous dispersion of the black could be obtained using sodium or potassium oleate. This same dispersing agent could then be utilized without further additions to emulsify the entire dispersion with a suitable quantity of linseed oil fatty acids, for example. This would result, under suitable agitation, in a fine emulsion of water and oil acids. The emulsion is then added to the proper amount of phthalic acid or anhydride requisite for the manufacture of the finished resin. The mass is heated to the melting point of the phthalic anhydride which is above the boiling point of water so that the water originally present in the emulsion is volatilized. At the melting point of the phthalic anhydride the latter appears to effectively flux the fatty acid-pigment paste to a smooth melt. The mass is then cooled, the requisite amount of glycerol or the like added, and the resin is formed by the normal condensation method.

As a modification of the above, the emulsion, after it has been formed from the aqueous pigment dispersion and the fatty acids, may be partially dehydrated in a drying oven and then added to the phthalic anhydride and brought to a smooth melt as described above. The remaining procedure is the same as above.

*Example I*

66 parts by weight of linseed oil fatty acids are warmed to a temperature of 30–40° C., to insure that they are in liquid form, and they are then added gradually with rapid stirring to 132 parts by weight of an aqueous dispersion of carbon black, containing 25% dry black in a 5% solution of sodium oleate. The stirring is maintained until a smooth emulsion results. The emulsion is placed in a drying oven at a temperature of 105–110° C. and held therein for about 4 hours. This drying action transforms the emulsion into pasty lumps, while allowing some of the water to remain in the mass.

These lumps are mixed with 74 parts of phthalic acid anhydride and the resulting mix is raised to a temperature of 250° C., at which temperature the molten phthalic anhydride effectively fluxes the pigment-oil component to a smooth melt. There is a lag in the rise in temperature to 250° C. at about 100° C. due to the volatilization of water which remains from the dehydration process as carried out in the oven. The length of time of this lag is naturally dependent on the amount of water present after the dehydrating operation, but experiment has shown that the resulting dispersion is not greatly affected by variation in this respect, the only effect being in the length of the time lag in raising the temperature to 250° C.

After the oil acid-pigment component has been fluxed by the molten phthalic anhydride, the mixture is cooled and 45 parts of glycerol is then added. The temperature is then raised in 15 minutes to 250° C. and held between 250 and 260 degrees for 30 minutes. On cooling, a fusible, soluble pigmented resin results.

*Example II*

132 parts by weight of the carbon black dispersion of Example I with 80 parts by weight of a mixture of equal parts of tung oil fatty acids and linseed oil fatty acids are dispersed with rapid stirring. 74 parts of phthalic anhydride are added and the temperature raised, resulting in the evaporation of the water in the emulsion and the fluxing of the pigment with the phthalic anhydride. 45 parts of glycerol are added after cooling the mass to about 150° C. and the heating is continued for about three-quarters of an hour with a finishing temperature of 275°–280° C.

The pigmented resinous composition so obtained is capable of a wide variety of uses depending mainly on the particular type of resin to which the above process may have been adapted. The examples given above would yield a drying oil-glyceryl phthalate type of resin which would be applicable in solution in various organic solvents for air-drying coatings. Such a type could be used alone as a coating composition, being thinned with xylol or other appropriate solvent for application, or it could be mixed with other resins, oils or nitrocellulose. Baking the above composition transforms it to a hard insoluble coating.

On the other hand, if non-drying oil acids were used in place of the linseed oil fatty acids in the above example, a non-drying oil-glyceryl phthalate type of resin would result. Such a type is used generally in cellulose ester lacquers.

The resulting compositions contain the pigment in concentrated form in the resins. They may be added to coating compositions in any desired proportion, and they are compatible with all those mixtures with which the resins are compatible.

One of the main advantages of the present invention is the elimination of tedius grinding procedures which would otherwise be necessary to obtain a dispersion equal to that obtainable by the process described. A further advantage lies in the fact that such pigmented compositions may be manufactured and marketed as such to the various industries. The products may then be treated as is now customary for unpigmented resins, only, by the use of the compositions described herein, pigmented coating compositions are obtained directly, while formerly an additional grinding or milling was necessary to obtain pigmented products. By my process a much higher gloss is obtainable in the finished coating than would be obtainable otherwise. While difficulties are often encountered by reason of the variations in carbon black, these do not interfere in the present process.

While I have described my invention giving several specific examples thereof, many variations may be made within the scope thereof. For instance, various details of the procedure, such as the time and temperature of the operation, the order of the steps, the proportions of the ingredients, the use of additional substances, and the like, may be varied. The drying of the water dispersion may take place to any desired extent, and oils may be used with the pigment in place of at least part of the corresponding fatty acids. Other or additional dispersing agents may be used with the pigment. The glycerol may be added to the reacting mass, at least in part, at the same stage as the phthalic anhydride. Pigments other than carbon black may be treated in the manner herein set forth and other resins, such as oil modified phenol-formaldehyde condensation products, may be formed in the process. These and other changes may be made in my invention, the character of which is defined in the claims appended hereto.

What I claim is:—

1. A method of making pigmented compositions which comprises providing an emulsion of a pigment with an oily constituent taken from the class consisting of drying, semi-drying and non-drying oils and the acids thereof, and reacting said constituent with substances to form a resin taken from the class consisting of alkyd and phenolic which is soluble in organic solvents, whereby said pigment is uniformly and intimately dispersed in said resin.

2. A method of making pigmented compositions which comprises providing a water emulsion of a pigment with an oily constituent taken from the class consisting of drying, semi-drying and non-drying oils and the acids thereof, and reacting said constituent with substances to form a resin taken from the class consisting of alkyd and phenolic which is soluble in organic solvents, whereby said pigment is uniformly and intimately dispersed in said resin.

3. A method of making pigmented compositions which comprises providing an emulsion of carbon black with an oily constituent taken from the class consisting of drying, semi-drying and non-drying oils and the acids thereof, and reacting said constituent with substances to form a resin taken from the class consisting of alkyd and phenolic which is soluble in organic solvents, whereby said pigment is uniformly and intimately dispersed in said resin.

4. A method of making pigmented compositions which comprises providing a water emulsion of a pigment with an oily constituent taken from the class consisting of drying, semi-drying and non-drying oils and the acids thereof, heating to remove water, mixing the same with substances capable of forming a resin therewith and reacting the mixture to form a resin, whereby said pigment is uniformly and intimately dispersed in said resin taken from the class consisting of alkyd and phenolic.

5. A method of making pigmented compositions which comprises providing a water emulsion of carbon black with an oily constituent taken from the class consisting of drying, semi-drying and non-drying oils and the acids thereof, mixing the same with a polycarboxylic acid and a polyhydric alcohol and reacting the mixture to form a resin, whereby said pigment is uniformly and intimately dispersed in said resin.

6. A method of making pigmented compositions which comprises providing a water emulsion of carbon black with an oily constituent taken from the class consisting of drying, semi-drying and non-drying oils and the acids thereof, heating to remove water, mixing the same with a polycarboxylic acid and a polyhydric alcohol and reacting the mixture to form a resin, whereby said pigment is uniformly and intimately dispersed in said resin.

7. A method of making pigmented compositions which comprises providing a water emulsion of carbon black with an oily constituent taken from the class consisting of drying, semi-drying and non-drying oils and the acids thereof, mixing the same with a polycarboxylic acid, heating the mixture, adding a polyhydric alcohol and reacting the mixture to form a resin, whereby said pigment is uniformly and intimately dispersed in said resin.

8. A method of making pigmented compositions which comprises providing an emulsion of a pigment with one of the constituents of a resin taken from the class consisting of alkyd and phenolic, and reacting said constituent with the other constituents of said resin to form a resin which is soluble in organic solvents.

CLARENCE F. SILLECK.